United States Patent
Taya et al.

(10) Patent No.: US 10,525,725 B2
(45) Date of Patent: Jan. 7, 2020

(54) IMAGE RECORDING METHOD, INK SET, AND METHOD OF PREPARING INK SET

(71) Applicant: CANON KABUSHIKI KAISHA, Tokyo (JP)

(72) Inventors: Akihiro Taya, Yokohama (JP); Masahiro Terada, Hadano (JP); Hidetaka Kawamura, Yokohama (JP); Yohei Masada, Tokyo (JP); Masanobu Ootsuka, Tokyo (JP); Takaharu Aotani, Tokyo (JP); Yutaka Yoshimasa, Yokohama (JP); Shoji Koike, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/696,706

(22) Filed: Sep. 6, 2017

(65) Prior Publication Data
US 2018/0079221 A1     Mar. 22, 2018

(30) Foreign Application Priority Data
Sep. 20, 2016  (JP) .................. 2016-182698

(51) Int. Cl.
| | |
|---|---|
| B41J 2/21 | (2006.01) |
| B41J 2/04 | (2006.01) |
| C09D 11/322 | (2014.01) |
| C09D 11/38 | (2014.01) |
| C09D 11/40 | (2014.01) |
| C09D 11/102 | (2014.01) |
| C09D 11/107 | (2014.01) |

(52) U.S. Cl.
CPC ............ *B41J 2/2107* (2013.01); *B41J 2/04* (2013.01); *C09D 11/102* (2013.01); *C09D 11/107* (2013.01); *C09D 11/322* (2013.01); *C09D 11/38* (2013.01); *C09D 11/40* (2013.01)

(58) Field of Classification Search
None
See application file for complete search history.

(56) References Cited

U.S. PATENT DOCUMENTS

| | | | |
|---|---|---|---|
| 5,658,376 A | 8/1997 | Noguchi et al. | |
| 8,586,647 B2 | 11/2013 | Kojima et al. | |

(Continued)

FOREIGN PATENT DOCUMENTS

| | | |
|---|---|---|
| EP | 3 031 871 A1 | 6/2016 |
| JP | 2007-146135 A | 6/2007 |

(Continued)

OTHER PUBLICATIONS

Feb. 6, 2018 extended European Search Report in European Patent Appln. No. 17191006.0.

*Primary Examiner* — Erica S Lin
(74) *Attorney, Agent, or Firm* — Venable LLP

(57) ABSTRACT

There is provided an image recording method including applying a first ink and a second ink, each of which contains a surfactant and the like, to a recording medium. Critical micelle concentration c1 (mass %) of the surfactant and concentration c2 (mass %) of the surfactant in each ink satisfy a relationship of "c1×2≤c2"; an HLB value of the surfactant is smaller than 13; content $V_1$ (mass %) of the surfactant in the first ink is larger than content $V_2$ (mass %) of the surfactant in the second ink.

13 Claims, 1 Drawing Sheet

(56) References Cited

U.S. PATENT DOCUMENTS

| | | | |
|---|---|---|---|
| 8,651,651 B2* | 2/2014 | Takaku | C09D 11/322 347/100 |
| 2009/0263632 A1 | 10/2009 | Kojima et al. | |
| 2010/0238246 A1* | 9/2010 | Ohzeki | B41M 7/00 347/102 |
| 2012/0320124 A1* | 12/2012 | Saito | C09D 11/326 347/21 |
| 2015/0275014 A1 | 10/2015 | Yamazaki et al. | |
| 2017/0210917 A1 | 7/2017 | Aotani et al. | |
| 2017/0210918 A1 | 7/2017 | Masada et al. | |
| 2017/0210919 A1 | 7/2017 | Yoshimasa et al. | |
| 2017/0210926 A1 | 7/2017 | Kawamura et al. | |
| 2017/0210927 A1 | 7/2017 | Kawamura et al. | |

FOREIGN PATENT DOCUMENTS

| | | |
|---|---|---|
| JP | 2010-064478 A | 3/2010 |
| WO | 2014/135684 A1 | 9/2014 |

\* cited by examiner

IMAGE RECORDING METHOD, INK SET, AND METHOD OF PREPARING INK SET

BACKGROUND OF THE INVENTION

Field of the Invention

The present invention relates to an image recording method, an ink set, and a method of preparing the ink set.

Description of the Related Art

In recent years, it has been required that a high-quality image can be recorded at higher speed in an image recording apparatus, such as an ink jet recording apparatus. However, in a case in which high-speed printing is performed using several kinds of inks, adjacent ink is applied before ink is absorbed in a recording medium. For this reason, there is a problem that a so-called bleeding phenomenon in which adjacent inks are mixed to each other on the recording medium is likely to be generated.

In order to suppress this bleeding phenomenon, examination has been made while focusing attention on a relationship between the surface tensions of several kinds of inks to be used. For example, an ink jet recording method, which uses a plurality of inks having a difference in surface tension of 1.0 mN/m or less is proposed (Japanese Patent Application Laid-Open No. 2010-064478). Further, an ink set in which the surface tension of a water-soluble organic solvent for color ink is higher than the surface tension of a water-soluble organic solvent for black ink and which includes ink containing a fluorochemical surfactant is proposed (Japanese Patent Application Laid-Open No. 2007-146135).

SUMMARY OF THE INVENTION

The present invention is to provide an image recording method that makes a discharge failure not easily occur and can record an image of which a bleeding phenomenon is suppressed even when high-speed printing is performed. Further, the present invention is to provide an ink set that is used in the image recording method and a method of preparing the ink set.

There is provided an image recording method including: applying a first ink and a second ink, each of which contains a pigment, resin particles, an organic solvent, a surfactant, and water, to a recording medium, wherein critical micelle concentration c1 (mass %) of the surfactant in the water and concentration c2 (mass %) of the surfactant in each of the first and second inks satisfy a relationship of "$c1 \times 2 \leq c2$", the surfactant is a surfactant which includes a hydrophilic group and a lipophilic group and an HLB value of which measured by Griffin method is smaller than 13, content $V_1$ (mass %) of the surfactant in the first ink is larger than content $V_2$ (mass %) of the surfactant in the second ink, and a liquid composition X', which is obtained when the surfactant is added to a liquid composition X formed of the first ink excluding the surfactant so as to have the content $V_2$ (mass %), and a liquid composition Y', which is obtained when the surfactant is added to a liquid composition Y formed of the second ink excluding the surfactant so as to have the content $V_2$ (mass %), satisfy the following condition A.

[Condition A]: When an image is recorded on a recording medium for evaluation of which an absorption coefficient Ka for water is larger than 0.1 $mL \cdot m^{-2} \cdot ms^{-1/2}$ and is 0.3 $mL \cdot m^{-2} \cdot ms^{-1/2}$ or less so that a recording area X' of the liquid composition X' and a recording area Y' of the liquid composition Y' are in contact with each other, the liquid composition Y' flowing out of the recording area Y' flows to the recording area X'.

Further features of the present invention will become apparent from the following description of exemplary embodiments with reference to the attached drawings.

DESCRIPTION OF THE EMBODIMENTS

Figure 1:
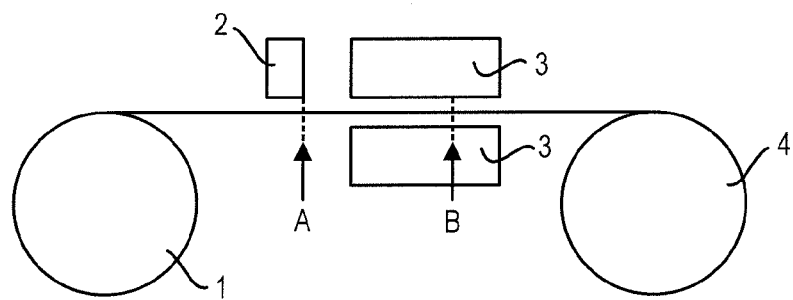
FIG. 1 is a schematic diagram illustrating an example of an image recording apparatus that is used in an image recording method of the present invention.

Preferred embodiments of the present invention will now be described in detail in accordance with the accompanying drawings.

As a result of the inventors' examination, it was understood that there was a case where a bleeding phenomenon was still generated in the recording method proposed in Japanese Patent Application Laid-Open No. 2010-064478 or a recording method using the ink set proposed in Japanese Patent Application Laid-Open No. 2007-146135. Further, since the ink of the ink set proposed in Japanese Patent Application Laid-Open No. 2007-146135 contains a fluorochemical surfactant, the surface tension of the ink is low and the refill of the ink is likely to be delayed. For this reason, it was found that a new problem that a discharge failure was likely to occur during high-speed printing was generated.

The present invention will be described in more detail using preferred embodiments. Further, aqueous ink for ink jet may be simply referred to as "ink". Furthermore, unless otherwise specifically noted, a physical property means a value at normal temperature (25° C.)

The inventors examined reasons that caused a bleeding phenomenon to be still generated in the recording methods proposed in Japanese Patent Application Laid-Open No. 2010-064478 and Japanese Patent Application Laid-Open No. 2007-146135 focusing attention on a relationship between the surface tensions of several kinds of inks. A relationship between the surface tensions of the inks was prescribed in terms of the suppression of "flowing" between the several kinds of inks in the recording methods proposed in Japanese Patent Application Laid-Open No. 2010-064478 and Japanese Patent Application Laid-Open No. 2007-146135. However, as a result of the examination, it was understood that factors other than the "flowing" also affected the generation of a bleeding phenomenon. That is, it was found that it was not possible to completely control "flowing" between the several kinds of inks by only prescribing a relationship between the surface tensions of the inks.

Accordingly, the inventors found out a test method of grasping a relationship of "flowing" between several kinds of inks by the following method. That is, in a case in which an image is recorded on a recording medium for evaluation so that the recording area of a first liquid composition and the recording area of a second liquid composition are in contact with each other, a recording area to which a liquid composition having flowed out flows is visually checked and the grasping of flowing is evaluated. At this time, when plain paper or the like having high liquid absorbency is used as the recording medium for evaluation, it is difficult to grasp the generation of the flowing of liquid. On the other hand, when glass, a vinyl chloride film, or the like substantially having no liquid absorbency is used as the recording medium for evaluation, the flowing of a liquid composition may be generated in both directions. Accordingly, it is difficult to discern the flowing of liquid. For this reason, a recording medium of which an absorption coefficient Ka for water is larger than 0.1 mL·m$^{-2}$·ms$^{-1/2}$ and is 0.3 mL·m$^{-2}$·ms$^{-1/2}$ or less is used as the recording medium for evaluation. Examples of such a recording medium can include paper for printing. Examples of the paper for printing on the markets can include OK Top Coat Plus (trade name, manufactured by Oji Paper Co., Ltd. and having Ka of 0.18 mL·m$^{-2}$·ms$^{-1/2}$), TOKUBISHI ART (trade name, manufactured by Mitsubishi Paper Mills Limited and having Ka of 0.12 mL·m$^{-2}$·ms$^{-1/2}$), Recycle Coat T-6 (Nippon Paper Industries Co., Ltd. and having Ka of 0.29 mL·m$^{-2}$·ms$^{-1/2}$), and the like.

Then, the inventors examined a method of suppressing a bleeding phenomenon when an image is recorded using an ink set of which a relationship of "flowing" between several kinds of inks was grasped by the test method. As a result, the inventors found out an image recording method of the present invention that satisfies requirements of (i) to (iii) to be described below.

(i) A surfactant, which includes a hydrophilic group and a lipophilic group and of which a hydrophile-lipophile balance (HLB) value measured by Griffin method is smaller than 13, is contained in ink.

(ii) Critical micelle concentration c1 (mass %) of the surfactant in water and concentration c2 (mass %) of the surfactant in each ink satisfy a relationship of "c1×2≤c2".

(iii) The content of the surfactant is adjusted for every ink.

Specifically, a case in which a liquid composition X', which is obtained when the surfactant is added to a liquid composition X formed of the ink excluding the surfactant so as to have a content V (mass %), and a liquid composition Y', which is obtained when the surfactant is added to a liquid composition Y formed of the ink excluding the surfactant so as to have the content V (mass %), satisfy the following condition A is assumed. In this case, ink, which is prepared when the surfactant is added to the liquid composition X so as to have a content $V_1$ (mass %), is referred to as "first ink", and ink, which is prepared when the surfactant is added to the liquid composition Y so as to have a content $V_2$ (mass %), is referred to as "second ink". Meanwhile, the liquid composition X', which is obtained when the surfactant is added to a liquid composition X formed of the first ink excluding the surfactant so as to have the content $V_2$ (mass %), and the liquid composition Y', which is obtained when the surfactant is added to the liquid composition Y formed of the second ink excluding the surfactant so as to have the content $V_2$ (mass %), satisfy the following condition A. In addition, the content $V_1$ (mass %) of the surfactant in the first ink is larger than the content $V_2$ (mass %) of the surfactant in the second ink. Further, when an ink set the content $V_2$ (mass %) of which is equal to or larger than "V (mass %)" derived so as to satisfy the following condition A is prepared and used, an image in which a bleeding phenomenon is suppressed can be recorded.

[Condition A]: An image is recorded on a recording medium for evaluation of which an absorption coefficient Ka for water is larger than 0.1 mL·m$^{-2}$·ms$^{-1/2}$ and is 0.3 mL·m$^{-2}$·ms$^{-1/2}$ or less so that a recording area X' of the liquid composition X' and a recording area Y' of the liquid composition Y' are in contact with each other. In this case, the liquid composition Y' flowing out of the recording area Y' flows to the recording area X'.

The inventors found out that more surfactant needs to be added to the ink forming a recording area to which the ink flows, in regard to an ink set of which a relationship of "flowing" between several kinds of inks was grasped by the test method. It is thought that the physical properties of ink of which droplets land on the recording medium are changed to physical properties different from the static physical properties of the ink in an ink tank with an increase in a material eluted from the recording medium, a ratio of a gas-liquid interface to the volume of droplets, or the like. It is thought that "flowing" between the several kinds of inks is caused by a difference in surface tension among the changed physical properties. For this reason, it is thought that a difference in surface tension is reduced since more surfactant is added to the ink forming the recording area to which the ink flows.

The surfactant, which is contained in the ink of the ink set, includes a hydrophilic group and a lipophilic group. In addition, the HLB value of the surfactant measured by Griffin method is smaller than 13. A recording medium on which a bleeding phenomenon is significantly generated is a medium, such as offset coated paper, having lipophilicity and low permeability for ink. The surfactant, which includes a lipophilic group and the HLB value of which is smaller than 13, is likely to be adsorbed on a lipophilic recording medium, and can make the surface of a recording medium be hydrophilic. For this reason, when ink containing the surfactant, which includes a lipophilic group and the HLB value of which is smaller than 13, is used, an image, which adheres to the surface of the recording medium and is not be repelled by the surface of the recording medium, can be recorded. In contrast, since a surfactant of which the HLB value is large is not easily adsorbed on the surface of the recording medium, ink containing this surfactant is likely to be repelled by the recording medium. Further, a fluoro-chemical surfactant, which does not include a lipophilic group and includes a hydrophobic and lipophobic perfluoro group, and the like extremely reduces the surface tension of ink. Accordingly, since the refill of ink containing a surfactant, such as a fluorochemical surfactant not including a lipophilic group, to a recording head is delayed, a discharge failure is likely to occur.

A surfactant of which an HLB value is smaller than 13 has low solubility in water, and there are also many surfactants of which less than 0.1 mass % is not dissolved in aqueous ink. As a result of the examination, it was found that a surfactant having low solubility in water could also be stably present in ink when a resin, which could adsorb a surfactant, was used together with the surfactant. Further, when ink droplets land on a recording medium, a surfactant is separated from a resin on which the surfactant has been adsorbed and is adsorbed on a necessary portion again. Accordingly, it was found that functions to suppress ink repellence to a recording medium, a bleeding phenomenon, and the like were exhibited. The concentration c2 (mass %) of a surfactant in ink, which is required for the suppression of a bleeding phenomenon, is more than double the critical micelle concentration c1 (mass %) of a surfactant in water. That is, most surfactant, which is not dissolved in ink, needs to be adsorbed on a resin, and a resin needs to have a function to adsorb a surfactant.

It is possible to estimate the capability of a resin to adsorb a surfactant by measuring the surface tension of a resin aqueous solution. When a surfactant is added to water, the surface tension of the water is gradually reduced to critical micelle concentration and is not changed after reaching the critical micelle concentration. In contrast, when a surfactant is added to a resin aqueous solution, a constant ratio of the surfactant is adsorbed on a resin. Accordingly, the amount of the surfactant adsorbed on a gas-liquid interface is reduced in comparison with a case in which the solution does not contain a resin. Accordingly, when water and the resin aqueous solution are compared with each other, the reduction ratio of the surface tension of the resin aqueous solution is smaller than that of water even though the concentration of the surfactant is the same. The concentration of a surfactant, which is obtained at the time when the surface tension of a resin aqueous solution is not changed while the surfactant is added to the resin aqueous solution, is denoted by $c_3$ (mass %). If the concentration $c_3$ (mass %) is more than double the critical micelle concentration $c_1$ (mass %), it can be determined that ink, which uses a resin contained in a resin aqueous solution, can contain the amount of a surfactant required for the suppression of a bleeding phenomenon. Meanwhile, as a result of the inventors' examination, it was found that resin particles, which formed emulsion, of the resin had the performance for adsorbing a surfactant higher than that of a water-soluble resin.

<Image Recording Method>

An image recording method of the present invention includes a step of applying a first ink and a second ink, each of which contains a pigment, resin particles, an organic solvent, a surfactant, and water, to a recording medium (ink applying step). Since a bleeding phenomenon can be suppressed at a higher level when the image recording method of the present invention further includes a step of heating the recording medium to which the first ink and the second ink are applied (heating step), it is preferable that the image recording method of the present invention further includes the heating step.

FIG. 1 is a schematic diagram illustrating an example of an image recording apparatus that is used in an image recording method of the present invention. FIG. 1 illustrates an aspect in which a recording medium is wound in the form of a roll again after an image is recorded on the recording medium wound in the form of a roll. The image recording apparatus illustrated in FIG. 1 includes units, such as a recording medium feeding unit 1, an ink applying unit 2, heating units 3, and a recording medium collecting unit 4. The recording medium feeding unit 1 is a unit that holds and feeds the recording medium wound in the form of a roll. The ink applying unit 2 is a unit that applies ink to the recording medium. The heating units 3 are units that heat the recording medium. The recording medium collecting unit 4 is a unit that winds the recording medium on which an image is recorded. The recording medium is conveyed along a conveying path by a conveying unit that is formed of pairs of rollers, a belt, or the like, and is subjected to processing by the respective units. The recording medium, which is wound in the form of a roll by the recording medium collecting unit 4, may be fed to another device or the like, and may be subjected to processing for cutting the recording medium to a desired size, binding the recording medium into a book, or the like. The conveying speed of the recording medium is preferably 50 m/min or more, and more preferably 100 m/min or more.

The recording medium is preferably conveyed so that the value of a ratio of the conveying speed (m/min) to the resolution (dpi) of an image to be recorded is 0.125 or more, and is more preferably conveyed so that the value of a ratio of the conveying speed (m/min) to the resolution (dpi) of an image to be recorded is 0.167 or more. When the value of a ratio of the conveying speed (m/min) to the resolution (dpi) is set in the above-mentioned range, a difference in time, which is required for an ink droplet to land on the recording medium and varies depending on the color of ink, can be reduced. Accordingly, an influence on ink bleeding, which is caused by a recording order, can be suppressed.

It is preferable that tension is applied to the recording medium during the conveyance of the recording medium. That is, it is preferable that the image recording apparatus includes a tension applying unit for applying tension to a recording medium. Specifically, a tension applying unit that applies tension to a recording medium, a tension adjusting unit that adjusts tension to be applied to a recording medium, and the like may be provided in a conveying mechanism that is provided between the recording medium feeding unit 1 and the recording medium collecting unit 4 illustrated in FIG. 1.

The tension to be applied to the recording medium is preferably 20 N/m or more, more preferably 30 N/m or more, and particularly preferably in the range of 40 N/m to 100 N/m. That is, in an ink applying step, it is preferable that ink is applied to the recording medium to which predetermined tension has been applied. When the tension to be applied to the recording medium is set to 20 N/m or more, the swelling of fiber, which is caused by water contained in ink, can be efficiently suppressed.

(Ink Applying Step)

In the ink applying step, ink is applied to the recording medium. It is preferable that an ink jet method is employed as a method of applying ink to the recording medium. That is, it is preferable that the image recording method of the present invention is an ink jet recording method. The ink jet method may be a thermal ink jet method of discharging ink from discharge ports of a recording head by applying thermal energy to ink, or may be a piezoelectric ink jet method of discharging ink from discharge ports of a recording head by using piezoelectric elements.

It is preferable that the image recording method of the present invention is a single-pass recording method. The "single-pass recording method" in this specification means a recording method of completing an image to be recorded in a unit area of a recording medium by a single relative scanning between a recording head and the recording medium. Further, the "relative scanning between a recording head and the recording medium" means the scanning of the recording head relative to the unit area of the recording medium or the scanning of the unit area of the recording medium relative to the recording head. Above all, a recording method of recording an image of an area, which corresponds to a length along which discharge ports of a recording head are arranged, by a single scanning of the recording head (scanning in the width direction of a recording medium) is more preferable.

(Heating Step)

In a heating step, the recording medium to which a first ink and a second ink are applied is heated. Particularly, the recording medium is preferably heated so that the surface temperature of the recording medium is 70° C. or more, and is more preferably heated so that the surface temperature of the recording medium is 80° C. or more. Further, in terms of preventing the deformation of the recording medium caused by heat, the recording medium is preferably heated so that the surface temperature of the recording medium is 140° C. or less. "The surface temperature of the recording medium to which ink is applied" in this specification means the surface temperature of the recording medium at a position to which the recording medium is conveyed at 0.5 sec in a case in which a time at which ink is applied to the recording medium is assumed as 0 sec. Specifically, the conveying speed of the recording medium is denoted by V (m/min). Furthermore, the surface temperature of the recording medium is measured at a position (B in FIG. 1) to which a recording area X of ink on the recording medium is moved in the conveying direction of the recording medium by "V×0.5/60 (m)" from a position at which ink is applied (A in FIG. 1). In Examples, a non-contact infrared thermometer (trade name "digital radiation temperature sensor FT-H20", manufactured by Keyence Corporation) was used to measure the surface temperature of the recording medium at a position that is distant from the surface of the recording medium in a substantially vertical direction by 10 cm.

Examples of a method of heating the recording medium can include a method including providing a heater and heating at least one of the surface (the surface to which ink is applied) and the back side of a recording medium. In the heating step, the recording medium may be continuously heated until after the application of ink from before the application of ink. Above all, it is preferable that the recording medium is not heated or is heated so that the surface temperature of the recording medium is 60° C. or less, before ink is applied to the recording medium. Particularly, it is more preferable that the recording medium is not heated or is heated so that the surface temperature of the recording medium is 40° C. or less, before ink is applied to the recording medium.

The recording medium may be pressed using, for example, a pressure roller or the like while the recording medium is heated. It is possible to improve the fixability of an image by pressing the recording medium. The recording medium may be pressed in a part of the heating step instead of being pressed in the entire heating step, or may be pressed in multiple stages. Further, the image recording method may further include a pressing step in addition to the heating step.

<Ink Set>

An ink set, which is used in the image recording method of the present invention, includes a combination of the first ink and the second ink. The ink set may include inks (a third ink, a fourth ink, etc.) other than the first ink and the second ink. Further, at least two inks among the plurality of inks need to satisfy the above-mentioned relationship. However, it is more preferable that all the inks included in the ink set satisfy the above-mentioned relationship. For example, in a case in which the ink set includes the first ink, the second ink, and the third ink, it is preferable that all of the first and second inks, the first and third inks, and the second and third inks satisfy the above-mentioned relationship.

(Ink)

Each of the first and second inks of the ink set of the present invention contains a pigment, resin particles, an organic solvent, a surfactant, and water. Components, which can be used in the ink of the ink set of the present invention, will be described below.

[Surfactant]

The surfactant, which is contained in the first and second inks, is a surfactant which includes a hydrophilic group and a lipophilic group and an HLB value of which measured by Griffin method is less than 13 and is preferably in the range of 4 to 10. Further, it is preferable that the surfactant is a surfactant represented by General Formula (1) shown below. Examples of a commercial product of the surfactant can include ACETYLENOL E40, E60 (trade name, manufactured by Kawaken Fine Chemical Co., Ltd.); Dynol 800, 810 (trade name, manufactured by Air Products and Chemicals Inc.); and EMULGEN 103, 104, 106, and 108 (trade name, manufactured by Kao Corporation).

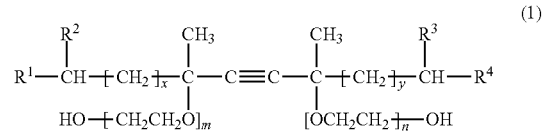

(In General Formula (1), $R^1$ to $R^4$ independently represent an alkyl group having 1 to 3 carbon atoms, each of x and y independently represents an integer of 1 to 5, and m+n represents an integer of 2 to 8.)

It is preferable that the content of the surfactant in the ink is in the range of 0.01 mass % to 3.00 mass % based on the total mass of the ink. Further, the ink may further contain a nonionic surfactant that is different from the aforementioned surfactants. In a case in which the ink contains a nonionic surfactant, it is preferable that a mass ratio of the content of the surfactant in the ink to the content of the nonionic surfactant is set in the range of 0.1 to 2.

[Pigment]

All of known pigments, which can be used in ink, can be used as the pigment. When a pigment is used as a color material, the water resistance of an image to be recorded can be improved. The content of the pigment in the ink is preferably in the range of 0.1 mass % to 15.0 mass % based on the total mass of the ink, and is more preferably in the range of 1.0 mass % to 10.0 mass % based on the total mass of the ink.

In a case in which pigments are classified depending on a difference in a dispersing method, examples of the pigment can include a resin-dispersed pigment that uses a resin as a dispersant, a self-dispersion pigment in which a hydrophilic group is introduced to the surface of each particle of a pigment, and the like. Examples of the resin-dispersed pigment include a resin-dispersed pigment that uses a resin dispersant, a microcapsule pigment in which the surface of each particle of a pigment is coated with a resin, a resin-bonding pigment in which an organic group including a resin is chemically bonded to the surface of each particle of a pigment, and the like. Ink of which a dispersing method is different may be used in the ink together. It is preferable that carbon black or an organic pigment is used as the pigment. One kind of pigment of the pigments can be used alone as the pigment or a combination of two or more kinds of pigments of the pigments can be used as the pigment.

The self-dispersion pigment is a pigment in which a hydrophilic group is directly bonded to the surface of each particle of a pigment or is bonded to the surface of each particle of a pigment through other groups (—R—). Examples of the hydrophilic group can include —COOM, —SO$_3$M, —PO$_3$HM, —PO$_3$M$_2$, and the like. It is preferable that "M" of the above-mentioned formulas is a hydrogen atom, alkali metal, ammonium, or organic ammonium. Since the discharge stability of ink in a case in which "M" of the above-mentioned formulas is alkali metal, such as lithium, sodium, or potassium, is better than that in a case in which "M" of the above-mentioned formulas is ammonium or organic ammonium, it is preferable that "M" of the above-mentioned formulas is alkali metal, such as lithium, sodium, or potassium. A part of or the entire hydrophilic group may be dissociated in the ink. Examples of other groups (—R—) can include an alkylene group of which the numbers of carbon atoms are in the range of 1 to 12, a substituted phenylene group, an unsubstituted phenylene group, a substituted naphthylene group, and an unsubstituted naphthylene group.

A pigment in which a hydrophilic group is introduced to the surface of each particle of a known inorganic pigment, such as carbon black, can be used as a self-dispersion pigment. Examples of a commercial product of self-dispersing carbon black can include CAB-O-JET200, 300, 352K, and 400 (trade name, manufactured by Cabot Corporation).

A pigment in which a hydrophilic group is introduced to the surface of each particle of a known organic pigment, such as carbon black, can be used as a self-dispersing organic pigment. A cyan pigment, a magenta pigment, and a yellow pigment which are known in the related art can be used as the organic pigment. It is preferable that a copper phthalocyanine pigment is used as the cyan pigment. Specifically, examples of the cyan pigment can include C.I. Pigment Blue 1, 2, 3, 15, 15:2, 15:3, 15:4, 16, 22, 60, and the like. Further, examples of a commercial product of a self-dispersing cyan pigment can include CAB-O-JET250C, 450C, and 554B (manufactured by Cabot Corporation).

It is preferable that a quinacridone pigment is used as the magenta pigment. Specifically, examples of the magenta pigment can include C.I. Pigment Red 5, 7, 12, 48, 48:1, 57, 112, 119, 122, 123, 146, 168, 184, 202, 207, and the like. Examples of a commercial product of a self-dispersing magenta pigment can include CAB-O-JET260M, 265M, 465M, and 480V (manufactured by Cabot Corporation).

It is preferable that an azo pigment is used as the yellow pigment. Specifically, examples of the yellow pigment can include C.I. Pigment Yellow 12, 13, 14, 16, 17, 74, 83, 93, 95, 97, 98, 114, 128, 129, 151, and 154. Examples of a commercial product of a self-dispersing yellow pigment can include CAB-O-JET270Y, 470Y, and 740Y (manufactured by Cabot Corporation).

In a case in which the pigment used in the ink is a resin-dispersed pigment, it is preferable that a resin including a hydrophilic portion and a hydrophobic portion is used as a dispersant. An acrylic resin or a urethane resin can be used as the resin. An acrylic resin is a resin that is obtained from the copolymerization of, for example, a monomer including a carboxy group, such as acrylic acid or methacrylic acid, and a monomer including an aromatic group, such as styrene. Further, a urethane resin is a resin that is obtained using diol including, for example, an anionic group, such as dimethylol propionic acid.

It is preferable that the acid value of a resin (resin dispersant) used as a dispersant is in the range of 50 mgKOH/g to 300 mgKOH/g. It is preferable that the weight-average molecular weight of the resin dispersant in terms of polystyrene, which is measured by Gel permeation chromatography (GPC), is in the range of 1000 to 15000. The content of the resin dispersant in the ink is preferably in the range of 0.1 mass % to 10.0 mass % based on the total mass of the ink, and is more preferably in the range of 0.2 mass % to 4.0 mass % based on the total mass of the ink. It is preferable that a mass ratio of the content of the resin dispersant in the ink to the content of the pigment is set in the range of 0.1 to 1.0.

It is preferable that carbon black is used as a pigment for black ink. Examples of a commercial product of the carbon black can include Raven: 1060, 1080, 1170, 1200, 1250, 1255, 1500, 2000, 3500, 5250, 5750, 7000, 5000 ULTRAII, and 1190 ULTRAII (trade names, manufactured by Columbian Carbon Company); Black Pearls L, MOGUL-L, Regal: 400R, 660R, 330R, Monarch: 800, 880, 900, 1000, 1300, and 1400 (trade names, manufactured by Cabot Corporation); Color Black: FW1, FW2, FW200, 18, S160, and S170, Special Black: 4, 4A, and 6, Printex: 35, U, 140U, V, and 140V (trade names, manufactured by Degussa AG); and No. 25, No. 33, No. 40, No. 47, No. 52, No. 900, No. 2300, No. 2600, MCF-88, MA600, MA7, MA8, and MA100 (trade names, manufactured by Mitsubishi Chemical Corporation).

It is preferable that a copper phthalocyanine pigment is used as a pigment for cyan ink. Examples of a color index number can include C.I. Pigment Blue 1, 2, 3, 15, 15:2, 15:3, 15:4, 16, 22, and 60.

It is preferable that a quinacridone pigment is used as a pigment for magenta ink. Examples of a color index number can include C.I. Pigment Red 5, 7, 12, 48, 48:1, 57, 112, 122, 123, 146, 168, 184, 202, and 207.

It is preferable that an azo pigment is used as a pigment for yellow ink. Examples of a color index number can include C.I. Pigment Yellow 12, 13, 14, 16, 17, 74, 83, 93, 95, 97, 98, 114, 128, 129, 151, and 154.

[Dye]

Dye can also be used in the ink together with the pigment as a color material. It is preferable that water-soluble dye including an anionic group, such as a sulfonate group or a carboxy group, is used as the dye. Specific examples of the dye can include acid dye, direct dye, reactive dye, and the like that are described in a color index. Further, dye, which is not described in the color index, can also be used as long as the dye is dye including an anionic group, such as a sulfonate group or a carboxy group.

[Organic Solvent]

It is preferable that a water-soluble organic solvent is used as the organic solvent. A water-soluble organic solvent, which can be used in general ink, can be used as the water-soluble organic solvent. Examples of the water-soluble organic solvent can include alcohols, glycols, alkylene glycols, polyethylene glycols, nitrogen-containing compounds, sulfur-containing compounds, and the like. One kind of water-soluble organic solvent of these water-soluble organic solvents can be used alone, or a combination of two or more kinds of water-soluble organic solvents of these water-soluble organic solvents can be used. Above all, it is preferable that the water-soluble organic solvent is glycerin or diethylene glycol. The content (mass %) of the organic solvent in the ink is preferably 30.0 mass % or more based on the total mass of the ink, and is more preferably in the range of 40.0 mass % to 90.0 mass % based on the total mass of the ink.

[Water]

It is preferable that the water used in the ink is deionized water (ion-exchanged water). It is preferable that the content of the water in the ink is in the range of 10.0 mass % to 60.0 mass % based on the total mass of the ink.

[Resin Particles]

The ink of the ink set, which is used in the image recording method of the present invention, contains resin particles in terms of the viscosity of the ink or the adsorption performance of the surfactant. It is preferable that polyurethane resin particles or acrylic resin particles are used as the resin particles. The content (mass %) of the resin particles in the ink is preferably in the range of 0.1 mass % to 15.0 mass % based on the total mass of the ink, and is more preferably in the range of 1.0 mass % to 8.0 mass % based on the total mass of the ink. When the content of the resin particles is less than 0.1 mass %, the solidity of an image may be insufficient. Meanwhile, when the content of the resin particles is larger than 15.0 mass %, the sticking resistance and the like of an image may be insufficient.

(1) Polyurethane Resin Particles

[1] Physical Properties of Polyurethane Resin Particle

It is preferable that the weight-average molecular weight of the polyurethane resin particles in terms of polystyrene, which is measured by Gel permeation chromatography (GPC), is in the range of 5000 to 150000. Further, it is more preferable that the weight-average molecular weight of the polyurethane resin particles in terms of polystyrene is in the range of 8000 to 100000. Since the strength of the polyurethane resin particles is lowered when the weight-average molecular weight of the polyurethane resin particles is 5000 or less, there is a case where the scratch resistance of an image is insufficient. On the other hand, when the weight-average molecular weight of the polyurethane resin particles is larger than 150000, there is a case where the storage stability, discharge stability, or the like of ink is insufficient. Meanwhile, the weight-average molecular weight of the resin particles can be measured and calculated using, for example, devices to be described below and the like.

Device: Alliance GPC 2695 (manufactured by Waters Co., Ltd.)

Column: Four-connection column of Shodex KF-806M (manufactured by Showa Denko K.K.)

Detector: RI (refractive index)

Polystyrene standard sample: PS-1 and PS-2 (manufactured by Polymer Laboratories)

The acid value of the polyurethane resin particle is preferably 100 mgKOH/g or less, and is more preferably in the range of 5 mgKOH/g to 30 mgKOH/g. The acid value of the polyurethane resin particle can be measured by a titration method. For example, resin particles are dissolved in tetrahydrofuran (THF) and an automatic potentiometric titrator (trade name "AT510", manufactured by Kyoto Electronics Manufacturing Co., Ltd.) is used to perform potentiometric titration using potassium hydroxide ethanol titrant, so that an acid value can be measured. The glass transition temperature of the polyurethane resin particle is preferably −80° C. or more and is more preferably −50° C. or more. Further, the glass transition temperature of the polyurethane resin particle is preferably 120° C. or less and is more preferably 100° C. or less.

[2] Method of Manufacturing Polyurethane Resin Particle

The polyurethane resin particles can be manufactured by a method in the related art that is generally used. For example, after polyol not including an acid group is sufficiently stirred and dissolved in an organic solvent, such as methyl ethyl ketone, polyisocyanate and diol including an acid group are added and are made to react, so that a urethane prepolymer solution is obtained. Then, after the obtained urethane prepolymer solution is neutralized, ion-exchanged water is added to the urethane prepolymer solution and a mixture of the urethane prepolymer solution and the ion-exchanged water is stirred at high speed by a homomixer so as to be emulsified. A chain extender is further added to the mixture and a chain extension reaction is performed, so that the polyurethane resin particles can be manufactured.

[2-1] Polyisocyanate

Polyurethane, which forms the polyurethane resin particles, usually includes a unit derived from polyisocyanate. "Polyisocyanate" in this specification means a compound including two or more isocyanate groups. Examples of the polyisocyanate can include aliphatic polyisocyanate, alicyclic polyisocyanate, aromatic polyisocyanate, and aromatic-aliphatic polyisocyanate. It is preferable that a ratio of the unit, which is derived from polyisocyanate, to the polyurethane is in the range of 10.0 mass % to 80.0 mass %.

Examples of the aliphatic polyisocyanate can include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Examples of the alicyclic polyisocyanate can include isophorone diisocyanate, hydrogenated xylylene diisocyanate, dicyclohexylmethane 4,4'-diisocyanate, 1,4-cyclohexane diisocyanate, methyl cyclohexylene diisocyanate, and 1,3-bis (isocyanatomethyl) cyclohexane.

Examples of the aromatic polyisocyanate can include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate.

Examples of the aromatic-aliphatic polyisocyanate can include dialkyldiphenylmethane diisocyanate, tetraalkyldiphenylmethane diisocyanate, and α,α,α,α-tetramethylxylylene diisocyanate. One kind of polyisocyanate of these polyisocyanates can be used alone, or a combination of two or more kinds of polyisocyanates of these polyisocyanates can be used. It is preferable that at least one selected from isophorone diisocyanate, hexamethylene diisocyanate, and dicyclohexylmethane 4,4'-diisocyanate is used among these kinds of polyisocyanate.

[2-2] Polyol Not Including Acid Group

Polyurethane, which forms the polyurethane resin particles, usually includes a unit derived from the polyol not including an acid group. It is preferable that a ratio of the unit, which is derived from the polyol not including an acid group, to the polyurethane is in the range of 0.1 mass % to 80.0 mass %.

Examples of the polyol, which does not include an acid group, can include polyester polyol, polyether polyol, polycarbonate diol, and the like. It is preferable that the numbers of carbon atoms of the polyol, which does not include an acid group, is in the range of 13 to 250. Further, it is preferable that the number-average molecular weight of the polyol, which does not include an acid group, in terms of polystyrene, which is measured by GPC, is in the range of 600 to 4000.

Examples of the polyester polyol can include ester of an acid component and polyalkylene glycol or polyhydric alcohol. Examples of the acid component can include aromatic dicarboxylic acid, alicyclic dicarboxylic acid, aliphatic dicarboxylic acid, and the like. Examples of the aromatic dicarboxylic acid can include isophthalic acid, terephthalic acid, orthophthalic acid, 1,4-naphthalenedicarboxylic acid, 2,5-naphthalenedicarboxylic acid, 2,6-naphthalenedicarboxylic acid, biphenyldicarboxylic acid, tetrahydrophthalic acid, and the like. Examples of the alicyclic dicarboxylic acid can include a hydrogenated product of the aromatic dicarboxylic acid, and the like. Examples of the aliphatic dicarboxylic acid can include malonic acid, succinic acid, tartaric acid, oxalic acid, glutaric acid, adipic acid, pimelic acid, suberic acid, azelaic acid, sebacic acid, alkylsuccinic acid, linoleic acid, maleic acid, fumaric acid, mesaconic acid, citraconic acid, itaconic acid, and the like. Further, reactive derivatives of these acid components, such as acid anhydrides, alkyl ester, and acid halide, can be used as the acid component. One kind of acid component of these acid components can be used alone, or a combination of two or more kinds of acid components of these acid components can be used.

Examples of the polyalkylene glycol can include polyethylene glycol, polypropylene glycol, polytetramethylene glycol, an ethylene glycol-propylene glycol copolymer, and the like. Among polyhydric alcohols, examples of dihydric alcohol can include hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, 4,4'-dihydroxyphenylmethane, and the like. Examples of trivalent or higher polyhydric alcohol can include glycerin, trimethylolpropane, 1,2,5-hexanetriol, 1,2,6-hexanetriol, pentaerythritol, and the like. One kind of polyester polyol of these polyester polyols can be used alone, or a combination of two or more kinds of polyester polyols of these polyester polyols can be used.

Examples of the polyether polyol can include polyalkylene glycol, an addition polymer of alkylene oxide and polyhydric alcohol, and the like. Examples of the polyalkylene glycol can include polyethylene glycol, polypropylene glycol, polytetramethylene glycol, an ethylene glycol-propylene glycol copolymer, and the like. Among polyhydric alcohols, examples of dihydric alcohol can include hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, 4,4'-dihydroxyphenylmethane, and the like. Examples of trivalent or higher polyhydric alcohol can include glycerin, trimethylolpropane, 1,2,5-hexanetriol, 1,2,6-hexanetriol, pentaerythritol, and the like. Examples of the alkylene oxide can include ethylene oxide, propylene oxide, butylene oxide, α-olefin oxide, and the like. One kind of polyether polyol of these polyether polyols can be used alone, or a combination of two or more kinds of polyether polyols of these polyether polyols can be used.

Polycarbonate diol, which is manufactured by a known method in the related art, can be used as the polycarbonate diol. For example, examples of the polycarbonate diol can include polycarbonate diol that is obtained from a reaction of a carbonate component, such as alkylene carbonate, diaryl carbonate, or dialkyl carbonate, or phosgene and an aliphatic diol component. One kind of polycarbonate diol of these polycarbonate diols can be used alone, or a combination of two or more kinds of polycarbonate diols of these polycarbonate diols can be used.

It is preferable that polyether polyol is used as the polyol not including an acid group. Since a resin film of which flexibility is moderately manifested is formed when polyether polyol is used, the scratch resistance of an image can be improved. Further, since the hydrophilicity of polyether polyol is relatively high, the discharge stability of ink can be further improved. It is particularly preferable that polypropylene glycol is used among the polyether polyols.

[2-3] Diol Including Acid Group

It is preferable that polyurethane, which forms the polyurethane resin particles, generally includes a unit derived from the diol including an acid group. "The diol including an acid group" in this specification means diol including an acid group, such as a carboxy group, a sulfonate group, or a phosphate group. The diol including an acid group may be present in the state of alkali metal salt, such as Li, Na, or K, ammonia, or organic amine salt, such as dimethylamine. It is preferable that dimethylolpropionic acid or dimethylol butanoic acid is used as the diol including an acid group. One kind of diol of these diols including an acid group can be used alone, or a combination of two or more kinds of diols of these diols including an acid group can be used. It is preferable that a proportion of the unit, which is derived from the diol including an acid group, in the polyurethane is in the range of 5.0 mass % to 40.0 mass %.

[2-4] Chain Extender

A chain extender may be used during the manufacture of the polyurethane resin particles. The chain extender is a compound that can react with a residual isocyanate group that does not form a urethane bond among units derived from polyisocyanate included in a urethane prepolymer. Examples of the chain extender can include polyamine compounds, such as trimethylol melamine and derivatives thereof, dimethylol urea and derivatives thereof, dimethylethylamine, diethanolmethylamine, dipropanolethylamine, dibutanolmethylamine, ethylenediamine, propylenediamine, diethylenetriamine, hexylenediamine, triethylenetetramine, tetraethylenepentamine, isophorone diamine, xylylenediamine, diphenylmethanediamine, hydrogenated diphenylmethanediamine, and hydrazine; polyamide-polyamine; and polyethylene-polyimine.

In addition, examples of the chain extender can includes ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, polyethylene glycol, 3-methyl-1,5-pentanediol, 2-butyl-2-ethyl-1,3-propanediol, 1,4-cyclohexanediol, 1,4-cyclohexanedimethanol, hydrogenated bisphenol A, glycerin, trimethylolpropane, and pentaerythritol. One kind of chain extender of these chain extenders can be used alone, or a combination of two or more kinds of chain extenders of these chain extenders can be used.

(2) Acrylic Resin Particles

"Acrylic resin particles" in this specification means particles made of an acrylic resin that is dispersed in an aqueous medium while having a diameter and is present as emulsion. Since the adsorption performance of a surfactant is low when a so-called water-soluble acrylic resin, which is present in an aqueous medium while not having a diameter, is used, there is a case where it is difficult to make a necessary surfactant be contained in ink.

[1] Method of Manufacturing Acrylic Resin Particle

A method of manufacturing the acrylic resin particles will be described using one example. A predetermined amount of monomer and 100 g of distilled water are put into a four-necked flask having a volume of 300 mL. A stirring seal, a stirring rod, a reflux cooling tube, a septum rubber, and a nitrogen introduction tube are mounted on the flask, and nitrogen substitution is performed for one hour while the monomer and the distilled water are stirred at 300 rpm in a constant-temperature bath of 70° C. A polymerization initiator dissolved in 100 g of distilled water is injected into the flask by a syringe to start polymerization. The state of polymerization is monitored by GPC and NMR, and a desired polymerization product is obtained. A step of dispersing obtained sediment in distilled water again is repeated after centrifugal separation, so that a refined water dispersion of an acrylic resin (acrylic resin particles) can be obtained. The obtained acrylic resin particles may be concentrated by an evaporator, ultrafiltration, or the like as necessary.

The same polymerization initiator as a polymerization initiator, which is used in usual radical polymerization, can be used as the polymerization initiator. Examples of the polymerization initiator can include potassium persulfate, 2,2'-azobis(2-amidinopropane) dihydrochloride, and the like. During polymerization, an emulsifier, a chain transfer agent, a neutralizer, and the like can be used in a usual manner. Examples of the emulsifier can include a nonionic surfactant and an amphoteric surfactant in addition to an anionic surfactant, such as sodium lauryl sulfate. Examples of the chain transfer agent can include t-dodecyl mercaptan, n-dodecyl mercaptan, n-octyl mercaptan, xanthogens (dimethylxanthogen disulfide, diisobutylxanthogen disulfide, and the like), dipentene, indene, 1,4-cyclohexadiene, dihydrofuran, and xanthene. Examples of the neutralizer can include ammonia, inorganic alkali hydroxide, and the like. Sodium hydroxide and potassium hydroxide are preferable as the inorganic alkali hydroxide.

[2] Monomer Used for Acrylic Resin Particle

Examples of the monomer, which is used to manufacture an acrylic resin forming the acrylic resin particles, can include (meth)acrylic acid alkyl ester, such as methyl (meth)acrylate, ethyl (meth)acrylate, propyl (meth)acrylate, butyl (meth)acrylate, hexyl (meth)acrylate, octyl (meth)acrylate, lauryl (meth)acrylate, and stearyl (meth)acrylate; and (meth)acrylic acid, such as acrylic acid and methacrylic acid. The acrylic resin may be a homopolymer of each of these monomers and may be a copolymer of the monomer and other monomers. Examples of a monomer, which is copolymerized with the monomer, can include vinylesters, olefins, styrenes, crotons, itaconic acids, maleic acids, fumaric acids, acrylamides, allyl compounds, vinyl ethers, vinyl ketones, glycidyl esters, unsaturated nitriles, and the like. In a case in which the acrylic resin is a copolymer, it is preferable that a proportion of a unit, which is derived from (meth)acrylic acid alkyl ester or (meth)acrylic acid, in the entire copolymer is 60.0 mol % or more.

[3] Physical Properties of Acrylic Resin Particle

The 50% cumulative volume average particle diameter ($D_{50}$) of the acrylic resin particles is preferably in the range of 1 nm to 200 nm, is more preferably in the range of 10 nm to 200 nm, and is particularly preferably 150 nm or less. $D_{50}$ of the acrylic resin particles is measured by a method to be described below. First, a resin particle dispersion is diluted by 50 times (based on volume) by pure water to prepare a sample to be measured. Then, a dynamic light scattering particle size analyzer (for example, trade name "UPA-EX150" (manufactured by Nikkiso Co., Ltd.)) is used to measure $D_{50}$ of the resin particles under conditions in which SetZero is 30s, the number of times of measurement is three, measurement time is 180 sec, and a refractive index is 1.5.

[4] Content of Acrylic Resin Particles

It is preferable that that content (mass %) of the acrylic resin particles in the ink is in the range of 0.1 mass % to 10.0 mass % based on the total mass of the ink. When the content of the acrylic resin particles is less than 0.1 mass %, an effect of improving the scratch resistance of an image may be insufficient. Meanwhile, when the content of the acrylic resin particles is larger than 10.0 mass %, an effect of improving the discharge stability of ink may be insufficient.

[Other Components]

A water-soluble organic compound, which is solid at normal temperature, for example, polyhydric alcohols such as trimethylolpropane, trimethylolethane, urea, a urea derivative, such as ethylene urea, and the like may be contained in the ink of the ink set of the present invention as necessary. In addition, various additives, such as a surfactant, a pH adjuster, a rust inhibitor, a preservative, an antifungal agent, an oxidation inhibitor, a reduction inhibitor, an evaporation accelerator, and a chelator, may be contained in the ink other than the above-mentioned materials as necessary.

(Recording Medium)

All kinds of mediums, which have been generally used in the past, can be used as the recording medium. Above all, it is preferable that a recording medium of which an absorption coefficient Ka for water is $0.1 \text{ mL} \cdot \text{m}^{-2} \cdot \text{ms}^{-1/2}$ or more is used. Further, it is more preferable that a recording medium of which an absorption coefficient Ka is $0.2 \text{ mL} \cdot \text{m}^{-2} \cdot \text{ms}^{-1/2}$ or more is used, and it is particularly preferable that a recording medium of which an absorption coefficient Ka is $0.3 \text{ mL} \cdot \text{m}^{-2} \cdot \text{ms}^{-1/2}$ or more is used. Bristow's method described in "a method of testing the liquid absorbency of paper and a paper board" of JAPAN TAPPI paper and pulp test method No. 51 can be used as a method of deriving the absorption coefficient Ka of the recording medium. Since Bristow's method is described in many books on the markets, the detailed description thereof will be omitted. However, Bristow's method is defined by wetting time Tw, an absorption coefficient Ka ($\text{mL} \cdot \text{m}^{-2} \cdot \text{ms}^{-1/2}$), and a roughness index Vr ($\text{mL/m}^2$).

Figure 2:
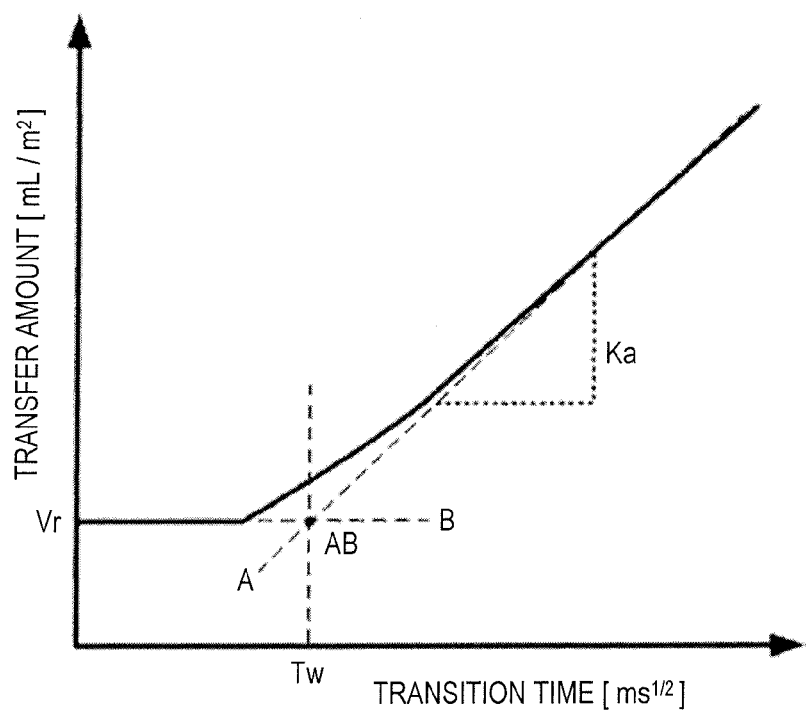
FIG. 2 is a diagram illustrating an example of an absorption curve illustrating the absorption coefficient Ka of a recording medium.

FIG. 2 is a diagram illustrating an example of an absorption curve illustrating the absorption coefficient Ka of a recording medium. The absorption curve illustrated in FIG. 2 is based on a permeation model in which liquid starts permeating into a recording medium when wetting time Tw has passed from the contact between liquid and the recording medium. The inclination of a straight line after the wetting time Tw is the absorption coefficient Ka, and the absorption coefficient Ka corresponds to the permeation rate of liquid into the recording medium. An intersection point AB of an approximation straight line A that is obtained by a least square method for calculating the absorption coefficient Ka, the transfer amount V of liquid, and a straight line B of "V=Vr" that is represented by a roughness index Vr is obtained; and the wetting time Tw can be obtained as time that is taken until the intersection point AB. Water having a temperature of 25° C. is used as liquid that is made to permeate into the recording medium. That is, "the absorption coefficient Ka" in this specification is absorption coefficient for water having a temperature of 25° C.

The recording medium may be a recording medium that is cut to a desired size in advance or may be a recording medium that is wound in the form of a roll. In a case in which a recording medium wound in the form of a roll is used, the recording medium may be cut to a desired size after an image is recorded on the recording medium. In a case in which tension is to be applied to a recording medium as described above, it is preferable that a recording medium wound in the form of a roll is used since tension is easily applied to the recording medium wound in the form of a roll.

According to the present invention, it is possible to provide an image recording method that makes a discharge failure not easily occur and can record an image of which a bleeding phenomenon is suppressed even when high-speed printing is performed. Further, according to the present invention, it is possible to provide an ink set that is used in the image recording method and a method of preparing the ink set.

EXAMPLES

The present invention will be described in more detail below using Examples and Comparative Examples, but is not limited to Examples to be described below at all as long as departing from the scope of the present invention. Meanwhile, the description of "part" and "%" in regard to the amount of a component is based on mass as long as being not particularly denied.

Example 1

(Preparation of Liquid Compositions Y-1, M-1, C-1, and K-1)

Liquid compositions Y-1, M-1, C-1, and K-1 having the same composition as the composition of ink, which is to be finally prepared, except that the liquid compositions Y-1, M-1, C-1, and K-1 do not contain a surfactant, were prepared. Specifically, after materials shown in Table 1 were mixed and sufficiently stirred, a mixture of the materials was filtered by a glass filter (trade name "AP20", manufactured by Millipore Corporation). A potassium hydroxide aqueous solution was appropriately added to adjust the pH of the mixture to 9.5, and the liquid compositions Y-1, M-1, C-1, and K-1 were prepared.

TABLE 1

PREPARATION OF LIQUID COMPOSITION (UNIT: PART)

| | | LIQUID COMPOSITION | | | |
|---|---|---|---|---|---|
| | | Y-1 | M-1 | C-1 | K-1 |
| PIGMENT*[1] | Cab-o-jet470Y | 5.0 | — | — | — |
| | Cab-o-jet465M | — | 5.0 | — | — |
| | Cab-o-jet450C | — | — | 5.0 | — |
| | Cab-o-jet400 | — | — | — | 5.0 |
| POLYURETHANE RESIN DISPERSION*[2] | | 6.0 | 6.0 | 6.0 | 6.0 |
| GLYCERIN | | 20.0 | 20.0 | 20.0 | 20.0 |
| POLYETHYLENE GLYCOL*[3] | | 6.0 | 6.0 | 6.0 | 6.0 |
| ION-EXCHANGED WATER | | 63.0 | 63.0 | 63.0 | 63.0 |

*[1]SELF-DISPERSION PIGMENT DISPERSION (MANUFACTURED BY Cabot Corporation, AS SOLID CONTENT)
*[2]TRADE NAME "Takelac W5661" (MANUFACTURED BY MITSUI CHEMICALS INC., AS SOLID CONTENT)
*[3]NUMBER-AVERAGE MOLECULAR WEIGHT = 1000

(Preparation of Liquid Compositions Y'-1, M'-1, C'-1, and K'-1)

1 part of a surfactant (trade name "ACETYLENOL E40", manufactured by Kawaken Fine Chemical Co., Ltd., HLB value=9.5 and critical micelle concentration≈0.2%) was added to 99 parts of each of the liquid compositions Y-1, M-1, C-1, and K-1. Accordingly, liquid compositions Y'-1, M'-1, C'-1, and K'-1 to be described below were prepared.

Liquid composition Y'-1=liquid composition Y-1 [99 parts]+surfactant [1 part]
Liquid composition M'-1=liquid composition M-1 [99 parts]+surfactant [1 part]
Liquid composition C'-1=liquid composition C-1 [99 parts]+surfactant [1 part]
Liquid composition K'-1=liquid composition K-1 [99 parts]+surfactant [1 part]

(Relationship of Flowing of Liquid Compositions Y'-1, M'-1, C'-1, and K'-1)

An ink jet recording apparatus including piezoelectric ink jet heads (trade name "KJ4", manufactured by Kyocera Corporation and having a nozzle density of 600 dpi) was prepared. The ink jet recording apparatus was used to record an image, in which the recording areas (solid images) of two kinds of liquid compositions are disposed so as to be in contact with each other, on a recording medium for evaluation. Meanwhile, Trade name "OK Top Coat Plus" (manufactured by Oji Paper Co., Ltd. and having an absorption coefficient Ka for water of 0.18 mL·m$^{-2}$·ms$^{-1/2}$ and a basis weight of 105 g/m$^2$) was used as the recording medium for evaluation. In regard to recording conditions, temperature was set to 23° C., relative humidity was set to 55%, ink discharge frequency was set to 40 kHz, the conveying speed of the recording medium was set to 100 m/min, and the volume of discharged ink per dot at the time of recording was set to about 12 pL. In the ink jet recording apparatus, a condition in which one dot of ink droplet of 12 ng was applied to a unit area of 1/600 inch×1/600 inch with a resolution of 600 dpi×600 dpi is defined as a condition in which recording duty is 100%. After the recorded image was kept at normal temperature for 24 hours, the boundary of the image was visually checked and the relationship of flowing was checked. Results are shown in Table 2.

TABLE 2

RELATIONSHIP OF FLOWING

| FLOWED SIDE | FLOWING SIDE |
|---|---|
| LIQUID COMPOSITION K'-1 | LIQUID COMPOSITION Y'-1 |
| | LIQUID COMPOSITION M'-1 |
| | LIQUID COMPOSITION C'-1 |
| LIQUID COMPOSITION C'-1 | LIQUID COMPOSITION Y'-1 |
| | LIQUID COMPOSITION M'-1 |
| LIQUID COMPOSITION M'-1 | LIQUID COMPOSITION Y'-1 |

(Determination of Content of Surfactant in Ink)

The contents (parts) of surfactants in the inks Y-1, M-1, C-1, and K-1 based on the 100 parts of the sum (the entire ink) of the liquid compositions and the surfactants are denoted by $V_Y$, $V_M$, $V_C$, and $V_K$, respectively. Further, the contents ($V_Y$, $V_M$, $V_C$, and $V_K$) of the surfactants in the inks were determined according to the order of (1) to (3) to be described below.

(1) Determination of $V_K$

Considering the relationship of flowing shown in Table 2 and [Condition A], a relationship of $V_Y$, $V_M$, $V_C$, and $V_K$ is as follows. Accordingly, it was determined first that $V_K$ was 1.0 part.

$$V_K < V_C < V_M < V_Y$$

(2) Determination of $V_C$

A relationship of $V_Y$, $V_M$, and $V_C$ is as follows.

$$1.0 < V_C < V_M < V_Y$$

Then, $V_C$ part of the surfactant (trade name "ACETYLENOL E40") was added to each of the liquid compositions Y-1, M-1, and C-1 to prepare liquid compositions Y"-1, M"-1, and C"-1 to be described below.

Liquid composition Y"-1=liquid composition Y-1 [100–$V_C$ parts]+surfactant [$V_C$ part]
Liquid composition M"-1=liquid composition M-1 [100–$V_C$ part]+surfactant [$V_C$ part]
Liquid composition C"-1=liquid composition C-1 [100–$V_C$ part]+surfactant [$V_C$ part]

After that, $V_C$ satisfying the relationship of flowing shown in Table 3 was examined by the same method as the above-mentioned method, and it was found that $V_C$ satisfying the relationship of flowing shown in Table 3 was "1.1 parts".

TABLE 3

RELATIONSHIP OF FLOWING

| FLOWED SIDE | FLOWING SIDE |
|---|---|
| LIQUID COMPOSITION Y"-1 | LIQUID COMPOSITION C"-1 |
| LIQUID COMPOSITION M"-1 | |

(3) Determination of $V_Y$ and $V_M$ $V_Y$ and $V_M$ were examined in the same manner as "(2) Determination of $V_C$", and it was found that $V_M$ was "1.3 parts" and $V_Y$ was "1.4 parts".

(Preparation of Ink Set)

The surfactant (trade name "ACETYLENOL E40") was added to each of the liquid compositions Y-1, M-1, C-1, and K-1 on the basis of the contents of the surfactants determined by the above-mentioned method. Accordingly, an ink set including inks Y-1, M-1, C-1, and K-1 to be described below was prepared.

Ink Y-1=liquid composition Y-1 [98.6 parts]+surfactant [1.4 parts]

Ink M-1=liquid composition M-1 [98.7 parts]+surfactant [1.3 parts]

Ink C-1=liquid composition C-1 [98.9 parts]+surfactant [1.1 parts]

Ink K-1=liquid composition K-1 [99.0 parts]+surfactant [1.0 part]

(Recording of Image (Production of Printed Matter 1))

An ink jet recording apparatus including piezoelectric ink jet heads (trade name "KJ4", manufactured by Kyocera Corporation and having a nozzle density of 600 dpi) was prepared. The ink jet recording apparatus was used to record an image, in which the recording areas (solid images) of four kinds of inks are disposed so as to be in contact with each other, on a recording medium of which an absorption coefficient Ka for water is in the range of 0.1 mL·m$^{-2}$·ms$^{-1/2}$ to 0.3 mL·m$^{-2}$·ms$^{-1/2}$. Meanwhile, Trade name "OK Top Coat Plus" (manufactured by Oji Paper Co., Ltd. and having a basis weight of 105 g/m$^2$) was used as the recording medium. In regard to recording conditions, temperature was set to 70° C., relative humidity was set to 55%, ink discharge frequency was set to 40 kHz, the conveying speed of the recording medium was set to 100 m/min, and the volume of discharged ink per dot at the time of recording was set to about 12 pL. In the ink jet recording apparatus, a condition in which one dot of ink droplet of 12 ng was applied to a unit area of 1/600 inch×1/600 inch with a resolution of 600 dpi×600 dpi is defined as a condition in which recording duty is 100%. The recorded image was kept at normal temperature for 24 hours, so that a printed matter 1 was obtained.

Example 2

The content of a surfactant was determined in the same manner as the above-mentioned Example 1 except that the surfactant is changed to Trade name "Dynol 800" (manufactured by Air Products and Chemicals, Inc., HLB value=8 and critical micelle concentration≈0.1%). Then, an ink set including inks Y-2, M-2, C-2, and K-2 to be described below was prepared. In addition, the prepared ink set was used to record an image by the same procedure as the above-mentioned Example 1, so that a printed matter 2 was obtained.

Ink Y-2=liquid composition Y-1 [98.2 parts]+surfactant [1.8 parts]

Ink M-2=liquid composition M-1 [98.4 parts]+surfactant [1.6 parts]

Ink C-2=liquid composition C-1 [98.7 parts]+surfactant [1.3 parts]

Ink K-2=liquid composition K-1 [99.0 parts]+surfactant [1.0 part]

Example 3

The content of a surfactant was determined in the same manner as the above-mentioned Example 1 except that the surfactant is changed to Trade name "ACETYLENOL E60" (manufactured by Kawaken Fine Chemical Co., Ltd., HLB value=12.3 and critical micelle concentration≈0.2%). Then, an ink set including inks Y-3, M-3, C-3, and K-3 to be described below was prepared. In addition, the prepared ink set was used to record an image by the same procedure as the above-mentioned Example 1, so that a printed matter 3 was obtained.

Ink Y-3=liquid composition Y-1 [98.5 parts]+surfactant [1.5 parts]

Ink M-3=liquid composition M-1 [98.7 parts]+surfactant [1.3 parts]

Ink C-3=liquid composition C-1 [98.9 parts]+surfactant [1.1 parts]

Ink K-3=liquid composition K-1 [99.0 parts]+surfactant [1.0 part]

Example 4

The content of a surfactant was determined in the same manner as the above-mentioned Example 1 except that liquid compositions Y-2, M-2, C-2, and K-2 shown in Table 4 were used. Then, an ink set including inks Y-4, M-4, C-4, and K-4 to be described below was prepared. In addition, the prepared ink set was used to record an image by the same procedure as the above-mentioned Example 1, so that a printed matter 4 was obtained.

Ink Y-4=liquid composition Y-2 [98.1 parts]+surfactant [1.9 parts]

Ink M-4=liquid composition M-2 [98.3 parts]+surfactant [1.7 parts]

Ink C-4=liquid composition C-2 [98.6 parts]+surfactant [1.4 parts]

Ink K-4=liquid composition K-2 [99.0 parts]+surfactant [1.0 part]

TABLE 4

PREPARATION OF LIQUID COMPOSITION (UNIT: PART)

| | | LIQUID COMPOSITION | | | |
|---|---|---|---|---|---|
| | | Y-2 | M-2 | C-2 | K-2 |
| PIGMENT*[1] | Cab-o-jet470Y | 5.0 | — | — | — |
| | Cab-o-jet465M | — | 5.0 | — | — |
| | Cab-o-jet450C | — | — | 5.0 | — |
| | Cab-o-jet400 | — | — | — | 5.0 |
| ACRYLIC RESIN DISPERSION*[4] | | 6.0 | 6.0 | 6.0 | 6.0 |
| GLYCERIN | | 20.0 | 20.0 | 20.0 | 20.0 |
| POLYETHYLENE GLYCOL*[3] | | 6.0 | 6.0 | 6.0 | 6.0 |
| ION-EXCHANGED WATER | | 63.0 | 63.0 | 63.0 | 63.0 |

*[1]SELF-DISPERSION PIGMENT DISPERSION (MANUFACTURED BY Cabot Corporation, AS SOLID CONTENT)
*[3]NUMBER-AVERAGE MOLECULAR WEIGHT = 1000
*[4]TRADE NAME "Neo Cryl BT-9" (MANUFACTURED BY DSM Coating Resins, AS SOLID CONTENT)

Example 5

The content of a surfactant was determined in the same manner as the above-mentioned Example 1 except that liquid compositions Y-3, M-3, C-3, and K-3 shown in Table 5 were used. Then, an ink set including inks Y-5, M-5, C-5, and K-5 to be described below was prepared. In addition, the prepared ink set was used to record an image by the same procedure as the above-mentioned Example 1, so that a printed matter 5 was obtained.

Ink Y-5=liquid composition Y-3 [98.1 parts]+surfactant [1.9 parts]

Ink M-5=liquid composition M-3 [98.3 parts]+surfactant [1.7 parts]

Ink C-5=liquid composition C-3 [98.6 parts]+surfactant [1.4 parts]

Ink K-5=liquid composition K-3 [99.0 parts]+surfactant [1.0 part]

TABLE 5

PREPARATION OF LIQUID COMPOSITION (UNIT: PART)

| | | LIQUID COMPOSITION | | | |
|---|---|---|---|---|---|
| | | Y-3 | M-3 | C-3 | K-3 |
| PIGMENT*[1] | Cab-o-jet470Y | 5.0 | — | — | — |
| | Cab-o-jet465M | — | 5.0 | — | — |
| | Cab-o-jet450C | — | — | 5.0 | — |
| | Cab-o-jet400 | — | — | — | 5.0 |
| POLYURETHANE RESIN DISPERSION*[5] | | 6.0 | 6.0 | 6.0 | 6.0 |
| GLYCERIN | | 20.0 | 20.0 | 20.0 | 20.0 |
| POLYETHYLENE GLYCOL*[3] | | 6.0 | 6.0 | 6.0 | 6.0 |
| ION-EXCHANGED WATER | | 63.0 | 63.0 | 63.0 | 63.0 |

*[1]SELF-DISPERSION PIGMENT DISPERSION (MANUFACTURED BY Cabot Corporation, AS SOLID CONTENT)
*[3]NUMBER-AVERAGE MOLECULAR WEIGHT = 1000
*[5]TRADE NAME "U9380" (MANUFACTURED BY Alberdingk, AS SOLID CONTENT)

Example 6

An image was recorded by the same procedure as the above-mentioned Example 1 except that temperature at the time of recording of the image was set to 23° C., so that a printed matter 6 was obtained.

Example 7

An image was recorded by the same procedure as the above-mentioned Example 1 except that temperature at the time of recording of the image was set to 55° C., so that a printed matter 7 was obtained.

Example 8

An image was recorded by the same procedure as the above-mentioned Example 1 except that ink discharge frequency at the time of recording of the image was set to 20 kHz and the conveying speed of a recording medium is set to 50 m/min, so that a printed matter 8 was obtained.

Example 9

An image was recorded by the same procedure as the above-mentioned Example 1 except that Trade name "OK Prince 64" (manufactured by Oji Paper Co., Ltd. and having an absorption coefficient Ka for water of 12.5 mL·m$^{-2}$·ms$^{-1/2}$ and a basis weight of 64 g/m$^2$) was used as a recording medium, so that a printed matter 9 was obtained.

Example 10

The content of a surfactant was determined in the same manner as the above-mentioned Example 1 except that the surfactant is changed to Trade name "EMULGEN E106" (manufactured by Kao Corporation, HLB value=10.5 and critical micelle concentration≈0.1%). Then, an ink set including inks Y-10, M-10, C-10, and K-10 to be described below was prepared. In addition, the prepared ink set was used to record an image by the same procedure as the above-mentioned Example 1, so that a printed matter 10 was obtained.

Ink Y-10=liquid composition Y-1 [98.4 parts]+surfactant [1.6 parts]

Ink M-10=liquid composition M-1 [98.6 parts]+surfactant [1.4 parts]

Ink C-10=liquid composition C-1 [98.8 parts]+surfactant [1.2 parts]

Ink K-10=liquid composition K-1 [99.0 parts]+surfactant [1.0 part]

Example 11

The content of a surfactant was determined in the same manner as the above-mentioned Example 1 except that the content $V_K$ of the surfactant in ink K-11 based on 100 parts of the entire ink was set to "0.50 parts". Then, an ink set including inks Y-11, M-11, C-11, and K-11 to be described below was prepared. In addition, the prepared ink set was used to record an image by the same procedure as the above-mentioned Example 1, so that a printed matter 11 was obtained.

Ink Y-11=liquid composition Y-1 [99.05 parts]+surfactant [0.95 parts]

Ink M-11=liquid composition M-1 [99.15 parts]+surfactant [0.85 parts]

Ink C-11=liquid composition C-1 [99.30 parts]+surfactant [0.70 parts]

Ink K-11=liquid composition K-1 [99.50 parts]+surfactant [0.50 parts]

Comparative Example 1

An ink set including inks Y-12, M-12, C-12, and K-12 to be described below was prepared in the same manner as the above-mentioned Example 1 except that the content of the surfactant was changed. In addition, the prepared ink set was used to record an image by the same procedure as the above-mentioned Example 1, so that a printed matter 12 was obtained.

Ink Y-12=liquid composition Y-1 [99.0 parts]+surfactant [1.0 part]

Ink M-12=liquid composition M-1 [98.6 parts]+surfactant [1.4 parts]

Ink C-12=liquid composition C-1 [98.3 parts]+surfactant [1.7 parts]

Ink K-12=liquid composition K-1 [98.1 parts]+surfactant [1.9 parts]

Comparative Example 2

The content of a surfactant was determined in the same manner as the above-mentioned Example 1 except that the surfactant is changed to Trade name "ACETYLENOL E100" (manufactured by Kawaken Fine Chemical Co., Ltd., HLB value=14 and critical micelle concentration=1% or more). Then, an ink set including inks Y-13, M-13, C-13, and K-13 to be described below was prepared. In addition, the prepared ink set was used to record an image by the same procedure as the above-mentioned Example 1, so that a printed matter 13 was obtained.

Ink Y-13=liquid composition Y-1 [98.0 parts]+surfactant [2.0 parts]

Ink M-13=liquid composition M-1 [98.2 parts]+surfactant [1.8 parts]

Ink C-13=liquid composition C-1 [98.5 parts]+surfactant [1.5 parts]

Ink K-13=liquid composition K-1 [99.0 parts]+surfactant [1.0 part]

Comparative Example 3

The content of a surfactant was determined in the same manner as the above-mentioned Example 1 except that the content $V_K$ of the surfactant in ink K-14 based on 100 parts of the entire ink was set to "0.10 parts". Then, an ink set including inks Y-14, M-14, C-14, and K-14 to be described below was prepared. In addition, the prepared ink set was used to record an image by the same procedure as the above-mentioned Example 1, so that a printed matter 14 was obtained.

Ink Y-14=liquid composition Y-1 [99.81 parts]+surfactant [0.19 parts]

Ink M-14=liquid composition M-1 [99.83 parts]+surfactant [0.17 parts]

Ink C-14=liquid composition C-1 [99.86 parts]+surfactant [0.14 parts]

Ink K-14=liquid composition K-1 [99.90 parts]+surfactant [0.10 parts]

Comparative Example 4

The content of a surfactant was determined in the same manner as the above-mentioned Example 1 except that liquid compositions Y-4, M-4, C-4, and K-4 shown in Table 6 were used. Then, an ink set including inks Y-15, M-15, C-15, and K-15 to be described below was prepared. However, an aspect in which the surfactant was not dissolved in the ink of the prepared ink set and was separated was observed.

Ink Y-15=liquid composition Y-4 [98.1 parts]+surfactant [1.9 parts]

Ink M-15=liquid composition M-4 [98.3 parts]+surfactant [1.7 parts]

Ink C-15=liquid composition C-4 [98.6 parts]+surfactant [1.4 parts]

Ink K-15=liquid composition K-4 [99.0 parts]+surfactant [1.0 part]

TABLE 6

PREPARATION OF LIQUID COMPOSITION (UNIT: PART)

| | | LIQUID COMPOSITION | | | |
|---|---|---|---|---|---|
| | | Y-4 | M-4 | C-4 | K-4 |
| PIGMENT*[1] | Cab-o-jet470Y | 5.0 | — | — | — |
| | Cab-o-jet465M | — | 5.0 | — | — |
| | Cab-o-jet450C | — | — | 5.0 | — |
| | Cab-o-jet400 | — | — | — | 5.0 |
| GLYCERIN | | 20.0 | 20.0 | 20.0 | 20.0 |
| POLYETHYLENE GLYCOL*[3] | | 6.0 | 6.0 | 6.0 | 6.0 |
| ION-EXCHANGED WATER | | 69.0 | 69.0 | 69.0 | 69.0 |

*[1]SELF-DISPERSION PIGMENT DISPERSION (MANUFACTURED BY Cabot Corporation, AS SOLID CONTENT)
*[3]NUMBER-AVERAGE MOLECULAR WEIGHT = 1000

Comparative Example 5

The content of a surfactant was determined in the same manner as the above-mentioned Example 1 except that the surfactant is changed to Trade name "FS3100" (fluorochemical surfactant, manufactured by DuPont, HLB value=9.8 and critical micelle concentration≈0.1%). Then, an ink set including inks Y-16, M-16, C-16, and K-16 to be described below was prepared. In addition, the prepared ink set was used to record an image by the same procedure as the above-mentioned Example 1, so that a printed matter 16 was obtained.

Ink Y-16=liquid composition Y-1 [98.3 parts]+surfactant [1.7 parts]

Ink M-16=liquid composition M-1 [98.5 parts]+surfactant [1.5 parts]

Ink C-16=liquid composition C-1 [98.8 parts]+surfactant [1.2 parts]

Ink K-16=liquid composition K-1 [99.0 parts]+surfactant [1.0 part]

Comparative Example 6

The content of a surfactant was determined in the same manner as the above-mentioned Example 1 except that liquid compositions Y-5, M-5, C-5, and K-5 shown in Table 7 were used. Then, an ink set including inks Y-17, M-17, C-17, and K-17 to be described below was prepared. However, an aspect in which the surfactant was not dissolved in the ink of the prepared ink set and was separated was observed.

Ink Y-17=liquid composition Y-4 [98.1 parts]+surfactant [1.9 parts]

Ink M-17=liquid composition M-4 [98.3 parts]+surfactant [1.7 parts]

Ink C-17=liquid composition C-4 [98.6 parts]+surfactant [1.4 parts]

Ink K-17=liquid composition K-4 [99.0 parts]+surfactant [1.0 part]

TABLE 7

PREPARATION OF LIQUID COMPOSITION (UNIT: PART)

| | | LIQUID COMPOSITION | | | |
|---|---|---|---|---|---|
| | | Y-5 | M-5 | C-5 | K-5 |
| PIGMENT*[1] | Cab-o-jet470Y | 5.0 | — | — | — |
| | Cab-o-jet465M | — | 5.0 | — | — |
| | Cab-o-jet450C | — | — | 5.0 | — |
| | Cab-o-jet400 | — | — | — | 5.0 |
| WATER-SOLUBLE ACRYLIC RESIN*[6] | | 6.0 | 6.0 | 6.0 | 6.0 |
| GLYCERIN | | 20.0 | 20.0 | 20.0 | 20.0 |
| POLYETHYLENE GLYCOL*[3] | | 6.0 | 6.0 | 6.0 | 6.0 |
| ION-EXCHANGED WATER | | 63.0 | 63.0 | 63.0 | 63.0 |

*[1]SELF-DISPERSION PIGMENT DISPERSION (MANUFACTURED BY Cabot Corporation, AS SOLID CONTENT)
*[3]NUMBER-AVERAGE MOLECULAR WEIGHT = 1000
*[6]TRADE NAME "Joncryl 60J" (MANUFACTURED BY BASF, AS SOLID CONTENT)

<Evaluation>

Among evaluation criteria for the respective evaluation items to be described below, "A" means a preferable level, "B" means an allowable level, and "C" means an unallowable level. Further, "-" means a level that cannot be evaluated or is not worth while being evaluated and is unallowable. Evaluation results are shown in Table 8.

(Capability of Preparation into Ink)

The states of the inks of the prepared ink sets were visually checked, and whether or not materials are changed to ink was evaluated on the basis of the evaluation criteria to be described below.

A: All materials were uniformly dissolved or dispersed.

C: Some components were observed to separate and float on the surface, and some components were observed to settle.

A: A distance to the end of the portion to which ink flowed was 0.2 mm or less.

B: A distance to the end of the portion to which ink flowed was larger than 0.2 mm and was 1.0 mm or less.

C: A distance to the end of the portion to which ink flowed was larger than 1.0 mm.

TABLE 8

EVALUATION RESULT

|  | PRINTED MATTER | WHETHER OR NOT MATERIALS ARE CHANGED TO INK | CONTINUOUS DISCHARGE PERFORMANCE | REPELLENCE | BLEEDING |
|---|---|---|---|---|---|
| EXAMPLE 1 | 1 | A | A | A | A |
| EXAMPLE 2 | 2 | A | A | A | A |
| EXAMPLE 3 | 3 | A | A | B | A |
| EXAMPLE 4 | 4 | A | A | A | A |
| EXAMPLE 5 | 5 | A | A | A | A |
| EXAMPLE 6 | 6 | A | A | B | B |
| EXAMPLE 7 | 7 | A | A | B | A |
| EXAMPLE 8 | 8 | A | B | A | A |
| EXAMPLE 9 | 9 | A | A | A | B |
| EXAMPLE 10 | 10 | A | A | A | B |
| EXAMPLE 11 | 11 | A | A | A | B |
| COMPARATIVE EXAMPLE 1 | 12 | A | A | A | C |
| COMPARATIVE EXAMPLE 2 | 13 | A | A | C | — |
| COMPARATIVE EXAMPLE 3 | 14 | A | A | A | C |
| COMPARATIVE EXAMPLE 4 | — | C | — | — | — |
| COMPARATIVE EXAMPLE 5 | 16 | A | C | A | — |
| COMPARATIVE EXAMPLE 6 | — | C | — | — | — |

(Continuous Discharge Performance)

Printing was continuously performed for 10 minutes to produce the respective printed matters, and continuous discharge performance was evaluated on the basis of evaluation criteria to be described below.

A: A streak caused by dot omission was not generated at all.

B: A streak caused by dot omission was generated on nozzles equal to or less than 1% of all nozzles.

C: A streak caused by dot omission was generated on nozzles more than 1% of all nozzles.

(Repellence)

A reflection densitometer (trade name "RD19I", manufactured by GretagMacbeth) was used to measure the optical densities of the darkest portions and the lightest portions of black printed areas of the produced printed matters, and repellence was evaluated on the basis of evaluation criteria to be described below.

A: A difference between the optical density of the darkest portion and the optical density of the lightest portion is 0.05 or less.

B: A difference between the optical density of the darkest portion and the optical density of the lightest portion exceeds 0.05 and is 0.1 or less.

C: A difference between the optical density of the darkest portion and the optical density of the lightest portion exceeds 0.1.

(Bleeding)

A distance to an end of a portion to which ink flowed from the boundary between colors in each produced printed matter was measured, and bleeding was evaluated on the basis of evaluation criteria to be described below.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-182698, filed Sep. 20, 2016, which is hereby incorporated by reference herein in its entirety.

What is claimed is:

1. An image recording method comprising:

applying a first ink and a second ink to a recording medium, wherein the first ink comprises a first pigment, first resin particles, a first organic solvent, a first surfactant, and water, wherein the second ink comprises a second pigment, second resin particles, a second organic solvent, a second surfactant, and water, wherein when a critical micelle concentration of the first surfactant in the water of the first ink is $c1'$ (mass %), and a concentration of the first surfactant in the first ink is $c2'$ (mass %), the critical micelle concentration $c1'$ and the concentration $c2'$ satisfy a relationship of $c1' \times 2 \leq c2'$, wherein when a critical micelle concentration of the second surfactant in the water of the second ink is $c1''$ (mass %), and a concentration of the second surfactant in the second ink is $c2''$ (mass %), the critical micelle concentration $c1''$ and the concentration $c2''$ satisfy a relationship of $c1'' \times 2 \leq c2''$, wherein an HLB value of the first surfactant measured by the Griffin method is smaller than 13, wherein an HLB value of the second surfactant measured by the Griffin method is smaller than 13, wherein the first surfactant and the second surfactant are the same, wherein a content $V_1$ (mass %) of the first surfactant in the first ink is larger than a content $V_2$ (mass %) of the second surfactant in the second ink, and wherein a liquid composition X', which is obtained when the first surfactant is added to a liquid composition X formed of the first ink and excluding the first surfactant, so as to have the content $V_1$ (mass %), and a liquid composition Y', which is obtained when the second surfactant is added to a liquid composition Y formed of the second ink and excluding the second surfactant, so as to have the content $V_2$ (mass %), satisfy the following condition A:

[Condition A]: When an image is recorded on a recording medium of which an absorption coefficient Ka for water is (i) larger than $0.1\ mL\cdot m^{-2}\cdot ms^{-1/2}$ and (ii) $0.3\ mL\cdot m^{-2}\cdot ms^{-1/2}$ or less, so that a recording area X" of the liquid composition X' and a recording area Y" of the liquid composition Y' are in contact with each other, the liquid composition Y' flowing out of the recording area Y" flows to the recording area X".

2. The image recording method according to claim 1, further comprising:

heating the recording medium to which the first ink and the second ink have been applied.

3. The image recording method according to claim 2, wherein the recording medium is heated so that a surface temperature of the recording medium is 70° C. or more.

4. The image recording method according to claim 1, wherein the recording medium is conveyed so that a value of a ratio of a conveying speed (m/min) to resolution (dpi) of an image to be recorded is 0.125 or more.

5. The image recording method according to claim 1, wherein the absorption coefficient Ka for water of the recording medium is $0.3\ mL\cdot m^{-2}\cdot ms^{-1/2}$ or less.

6. The image recording method according to claim 1, wherein each of the first surfactant and the second surfactant is represented by the following general formula (1):

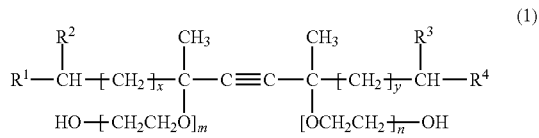

wherein, in the general formula (1), $R^1$ to $R^4$ independently represent an alkyl group having 1 to 3 carbon atoms, each of x and y independently represents an integer of 1 to 5, and m+n represents an integer of 2 to 8.

7. The image recording method according to claim 1, wherein each of the first surfactant and the second surfactant includes a hydrophilic group and a lipophilic group.

8. The image recording method according to claim 1, wherein each of the first resin particles and the second resin particles are polyurethane resin particles or acrylic resin particles.

9. The image recording method according to claim 1, wherein the content (mass %) of the first resin particles in the first ink is in the range of 0.1 mass % to 15.0 mass % based on the total mass of the first ink, and wherein the content (mass %) of the second resin particles in the second ink is in the range of 0.1 mass % to 15.0 mass % based on the total mass of the second ink.

10. The image recording method according to claim 1, wherein the HLB value of the first surfactant measured by the Griffin method is 9.5 or less, and wherein the HLB value of the second surfactant measured by the Griffin method is 9.5 or less.

11. The image recording method according to claim 1, wherein each of the first organic solvent and the second organic solvent is glycerin or diethylene glycol.

12. The image recording method according to claim 1, wherein each of the first ink and the second ink is an aqueous ink.

13. An ink set comprising:

a combination of a first ink and a second ink, wherein the first ink comprises a first pigment, first resin particles, a first organic solvent, a first surfactant, and water, wherein the second ink comprises a second pigment, second resin particles, a second organic solvent, a second surfactant, and water, wherein when a critical micelle concentration of the first surfactant in the water of the first ink is c1' (mass %), and a concentration of the first surfactant in the first ink is c2' (mass %), the critical micelle concentration c1' and the concentration c2' satisfy a relationship of c1'×2≤c2', wherein when a critical micelle concentration of the second surfactant in the water of the second ink is c1" (mass %), and a concentration of the second surfactant in the second ink is c2" (mass %), the critical micelle concentration c1" and the concentration c2" satisfy a relationship of c1"×2≤c2", wherein an HLB value of each of the first surfactant and the second surfactant measured by the Griffin method is smaller than 13, wherein the first surfactant and the second surfactant are the same, wherein a content $V_1$ (mass %) of the first surfactant in the first ink is larger than a content $V_2$ (mass %) of the second surfactant in the second ink, and wherein a liquid composition X', which is obtained when the first surfactant is added to a liquid composition X formed of the first ink and excluding the first surfactant, so as to have the content $V_1$ (mass %), and a liquid composition Y', which is obtained when the second surfactant is added to a liquid composition Y formed of the second ink and excluding the second surfactant, so as to have the content $V_2$ (mass %), satisfy the following condition A:

[Condition A]: When an image is recorded on a recording medium of which an absorption coefficient Ka for water is (i) larger than $0.1\ mL\cdot m^{-2}\cdot ms^{-1/2}$ and (ii) $0.3\ mL\cdot m^{-2}\cdot ms^{-1/2}$ or less, so that a recording area X" of the liquid composition X' and a recording area Y" of the liquid composition Y' are in contact with each other, the liquid composition Y' flowing out of the recording area Y" flows to the recording area X".

* * * * *